US011153095B2

(12) United States Patent
Becker et al.

(10) Patent No.: US 11,153,095 B2
(45) Date of Patent: Oct. 19, 2021

(54) FACILITATION OF IDENTIFICATION OF INTERNET-OF-THINGS HOST DEVICES

(71) Applicant: AT&T Mobility II LLC, Atlanta, GA (US)

(72) Inventors: Thomas Becker, Atlanta, GA (US); Jordan Alexander, Atlanta, GA (US); Paul Daunno, Lawrenceville, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 247 days.

(21) Appl. No.: 16/398,594

(22) Filed: Apr. 30, 2019

(65) Prior Publication Data

US 2020/0351101 A1    Nov. 5, 2020

(51) Int. Cl.
*H04L 9/32* (2006.01)
*G06F 21/44* (2013.01)
*H04L 29/06* (2006.01)

(52) U.S. Cl.
CPC ............ *H04L 9/3242* (2013.01); *G06F 21/44* (2013.01); *H04L 63/0442* (2013.01); *H04L 63/0876* (2013.01)

(58) Field of Classification Search
CPC ............... H04L 9/3242; H04L 63/0442; H04L 63/0876; H04L 2209/805; H04L 9/3239; H04L 9/0825; H04L 63/0428; H04L 2209/80; H04L 67/12; H04L 9/321; H04L 63/166; H04L 9/083; H04L 9/3247; H04L 9/3271; H04L 63/08; H04L 2209/84; H04L 2463/061; H04L 63/0478; H04L 63/0823; H04L 63/12; H04L 63/123; H04L 67/1095; H04L 67/28; H04L 9/0866; H04L 9/3263; H04L 2209/60; H04L 63/0457; H04L 63/062; H04L 67/16; H04L 9/0833; H04L 9/0838; H04L 9/0891; H04L 9/0894; H04L 9/3226; G06F 21/44; H04W 12/04; H04W 12/50; H04W 12/10; H04W 84/12; H04W 12/02; H04W 12/033; H04W 12/08; H04W 12/12; H04W 12/128; H04W 12/35; H04W 4/80; H04W 4/40; H04W 4/46; H04W 4/70; H04W 76/10; H04W 88/02;

(Continued)

(56) References Cited

U.S. PATENT DOCUMENTS

| 2013/0103939 A1* | 4/2013 | Radpour | ................. | H04L 9/321 |
| | | | | 713/152 |
| 2014/0096229 A1* | 4/2014 | Burns | ................. | H04L 63/1491 |
| | | | | 726/15 |
| 2019/0036965 A1* | 1/2019 | Luo | .......................... | H04L 45/74 |

* cited by examiner

*Primary Examiner* — Abiy Getachew
(74) *Attorney, Agent, or Firm* — Amin, Turocy & Watson, LLP

(57) ABSTRACT

A more efficient internet-of-things (IoT) manufacturing process can be achieved using hash functions to authenticate and identify IoT devices. Device data comprising manufacturer name data, device name data, software version data, and/or hardware version data can be feed through a hash function to generate hashed data. Additionally, same and/or similar data can be hashed via a manufacturing process. The two outputs from both sets of data can then be matched to determine the authentication of a device. Based on the authenticity of the device being verified, the IoT device can undergo a certification process as a part of the manufacturing process. This manufacturing process comprising hashed data can eliminate current manufacturing processes and allow for a unique identifier to be associated with the IoT device.

20 Claims, 10 Drawing Sheets

(58) Field of Classification Search
CPC . H04W 12/009; H04W 12/03; H04W 12/041;
H04W 4/029; H04W 4/12; H04W 4/21;
H04W 4/38; H04W 52/44; H04W 84/06;
H04W 84/18; H04W 8/18; H04W 8/245;
H04W 8/265
See application file for complete search history.

FACILITATION OF IDENTIFICATION OF INTERNET-OF-THINGS HOST DEVICES

TECHNICAL FIELD

This disclosure relates generally to facilitating an identification of internet-of-things host devices. More specifically, this disclosure relates to securely authenticating and identifying internet-of-things devices.

BACKGROUND

The Internet-of-things (IoT) is an extension of Internet connectivity into physical devices and everyday objects. Embedded with electronics, Internet connectivity, and other forms of hardware (such as sensors), these devices can communicate and interact with others over the Internet, and they can be remotely monitored and controlled. The definition of the Internet of things has evolved due to convergence of multiple technologies, real-time analytics, machine learning, commodity sensors, and embedded systems.

Traditional fields of embedded systems, wireless sensor networks, control systems, automation (including home and building automation), and others all contribute to enabling the IoT. IoT technology can be associated with the concept of the "smart home", industrial applications, connected cars, and/or "smart cities", covering devices and appliances (e.g., lighting fixtures, thermostats, home security systems and cameras, and other home appliances) that support one or more common ecosystems, and can be controlled via devices associated with that ecosystem, such as smartphones and smart speakers.

The above-described background relating to facilitating an identification of internet-of-things host devices is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
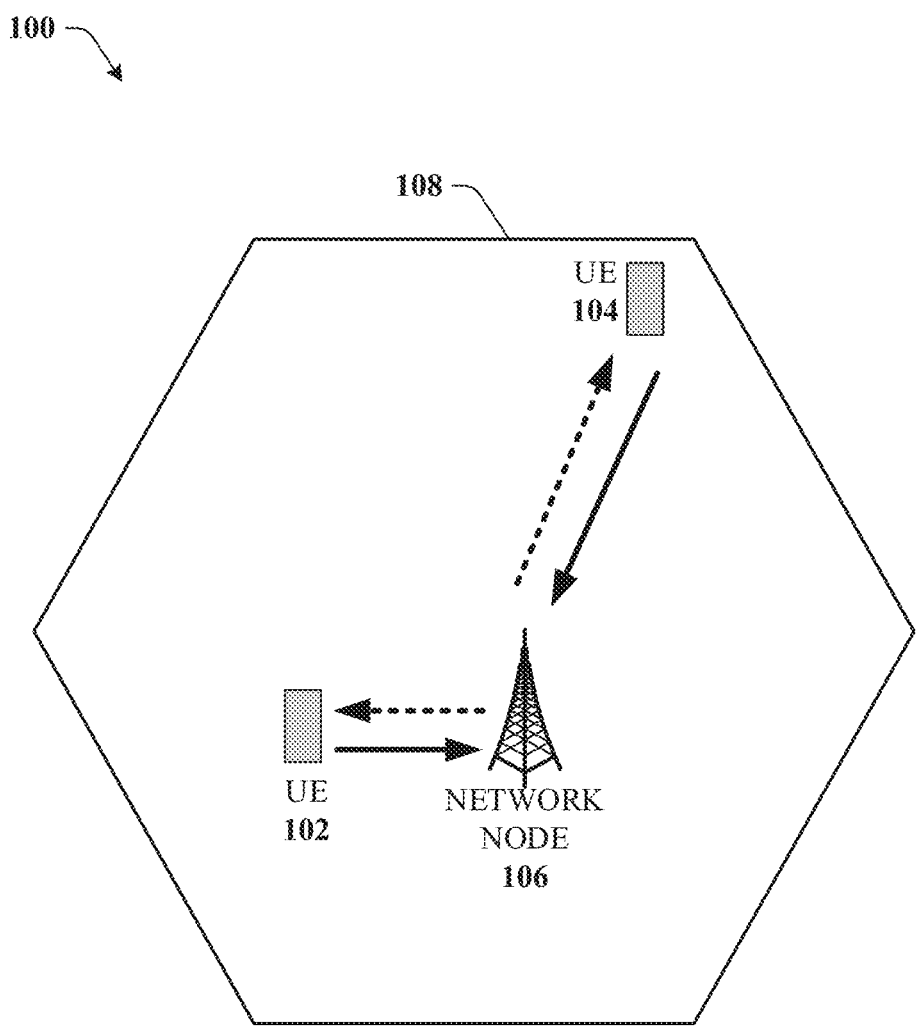
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate securely authenticating and identifying internet-of-things devices.

For simplicity of explanation, the methods are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium or a machine-readable storage medium.

It is noted that although various aspects and embodiments are discussed herein with respect to Universal Mobile Telecommunications System (UMTS) and/or Long Term Evolution (LTE), the disclosed aspects are not limited to a UMTS implementation and/or an LTE implementation. For example, aspects or features of the disclosed embodiments can be exploited in substantially any wireless communication technology. Such wireless communication technologies can include, but are not limited to, 5G NR, terrestrial microwave, satellite, traditional land mobile radio, UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate securely identifying internet-of-things devices. Facilitating securely identifying internet-of-things devices can be implemented in connection with any type of device with a connection to the communications network such as: a mobile handset, a computer, a handheld device, or the like.

Devices on a mobile network can utilize an international mobility equipment identifier (IMEI). The IMEI can be a fifteen-digit or sixteen-digit number wherein the first eight digits can identify a specific device (IMEI Type Allocation Code). However, with IoT devices, the TAC does not always identify the end device. Thus, the first eight digits for an IMEI of an IoT device can identify the radio module of the IoT device (e.g., using a wireless modules such as Sierra Wireless, Gemalto, Ublox, and Telit Wireless, etc.) but IMEI cannot reliably identify the end integrated device. Thus, the IMEI cannot be a reliable identifier to determine the make-up of IoT devices. It should also be noted that the IMEI can be any number of digits.

However, a convention can be developed such that an IoT device can be identified and a device manufacturer can place this information into a predetermined format that can be implemented into the manufacturing process. For example, information including, but not limited to, a company name, a device name, a hardware version, a software version, etc., can be placed in a standard format. A hash value can then be produced based on this data, and that hash value can then be used to uniquely identify that particular device. Currently, a hardware manufacturer receives a unique device identifier from the carrier, but this identifier is not known until a late stage (e.g., the device manufacturing stage). However, the aforementioned method allows the hardware manufacturer to put together a unique IoT identifier early in the manufacturing process such that they can build that into the device and launch without having to do a software revision to add a carrier specific identifier.

Hash functions can be used in cryptography to create a message digest that is unique to whatever is put into the hash. For example, if data is placed into a 256 byte hash function, then the hash function can output a string 256 characters long that is unique to the data that was placed into the hash function. Therefore, instead of assigning an identifier to the original equipment manufacturer (OEM), a hash function can be chosen such that the data input into the hash function is defined and what is output is defined by the hash function. Then the output from the hash function can be matched. It should be noted that there are multiple types of hash functions that can be used including, but not limited to a secure hash algorithm (SHA) hash function. The matching can occur at the carrier certification start procedure (e.g., T3). When a manufacturer begins certification, they go through an onboarding process and complete a series of questions about the devices. One such question that can be asked is, "what is the hash number of your manufacturer model number xx". When that question is answered, then another hash can be performed by the carrier, such that the carrier can have a message digest based on its hashing and the manufacturer can have a message digest based on its hash. The two message digests can then be matched to determine if what the carrier produced for its hash is the same as what the manufacturer has produced for its hash. If this is true, then the manufacturer can then proceed with the certification process.

Once an IoT device is out in the field and communicating over a wireless network, then the IoT device can send back the same hash that was collected at the certification start. Because the hash is connected to that particular device that was certified, then the carrier can tell how many of that exact model number of the IoT devices are utilizing the wireless network.

Additionally asymmetric cryptography can be used in this process as well. A public key can be shared with all manufacturers partnered with the carrier. The manufacturers can then take the public key, encrypt their set of parameters, and send the encrypted message back to the carrier when the device is in production.

It should also be noted that an artificial intelligence (AI) component can facilitate automating one or more features in accordance with the disclosed aspects. A memory and a processor as well as other components can include functionality with regard to the figures. The disclosed aspects in connection with securely authenticating and identifying IoT devices can employ various AI-based schemes for carrying out various aspects thereof. For example, a process for detecting one or more trigger events, modifying an output of a hash as a result of the one or more trigger events, and modifying one or more message digests, and so forth, can be facilitated with an example automatic classifier system and process. In another example, a process for penalizing one set of data as an input to a hash function while preferring another set of data can be facilitated with the example automatic classifier system and process.

An example classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that can be automatically performed.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing mobile device usage as it relates to triggering events, observing network frequency/technology, receiving extrinsic information, and so on). For example, SVMs can be configured via a learning or training phase within a classifier constructor and feature selection module. Thus, the classifier(s) can be used to automatically learn and perform a number of functions, including but not limited to modifying a hash, modifying one or more reported data from an IoT device, and so forth. The criteria can include, but is not limited to, predefined values, frequency attenuation tables or other parameters, service provider preferences and/or policies, and so on.

In one embodiment, described herein is a method comprising receiving, by a wireless network device comprising a processor, Internet-of-things development data representative of development data to be used to manufacture an Internet-of-things device. In response to the receiving the internet-of-things development data, the method can comprise applying, by the wireless network device, a first hash function to the Internet-of-things development data to encrypt the internet-of-things development data, resulting in encrypted data. Additionally, in response to the applying the first hash function, the method can comprise applying, by the wireless network device, a second hash function to the encrypted data to decrypt the encrypted data, resulting in decrypted data. Furthermore, based on the decrypted data, the method can comprise receiving, by the wireless network device, carrier certification data representative of a carrier entity associated with the internet-of-things device.

According to another embodiment, a system can facilitate, receiving development data representative of a criterion to be used to manufacture an internet-of-things device. In response to the receiving the development data, they system operations can comprise employing a first hash function to the development data to encrypt the development data, resulting in encrypted development data. In response to the employing the first hash function, the system operations can comprise matching the first hash function to a second hash function to decrypt the encrypted data, resulting in decrypted data. Additionally, based on the decrypted data, the system operations can comprise receiving carrier certification data representative of a carrier entity for the internet-of-things device to utilize.

According to yet another embodiment, described herein is a machine-readable storage medium that can perform the operations comprising receiving development data representative of a criterion to be used to manufacture an internet-of-things device. The machine-readable storage medium can perform the operations comprising encrypting the development data, resulting in encrypted development data in response to the receiving the development data. In response to the encrypting the development data, the machine-readable storage medium can perform the operations comprising facilitating decrypting the development data, resulting in decrypted development data. Furthermore, based on the decrypted data, the machine-readable storage medium can perform the operations comprising receiving carrier certification data representative of a carrier entity for the internet-of-things device to access.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 106. The network node (e.g., network node device) can communicate with user equipment (UE), thus providing connectivity between the UE and the wider cellular network. The UE 102 can send transmission type recommendation data to the network node 106. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 106. The dashed arrow lines from the network node 106 to the UE 102 represent downlink (DL) communications and the solid arrow lines from the UE 102, 104 to the network nodes 106 represents an uplink (UL) communication.

System 100 can further include one or more communication service provider networks that facilitate providing wireless communication services to various UEs, including UE 102, via the network node 106 and/or various additional network devices (not shown) included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks can be or include the wireless communication network and/or various additional devices and components of the wireless communication network (e.g., additional network devices and cell, additional UEs, network server devices, etc.). The network node 106 can be connected to the one or more communication service provider networks via one or more backhaul links 108. For example, the one or more backhaul links 108 can comprise wired link components, such as a TI/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 106). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
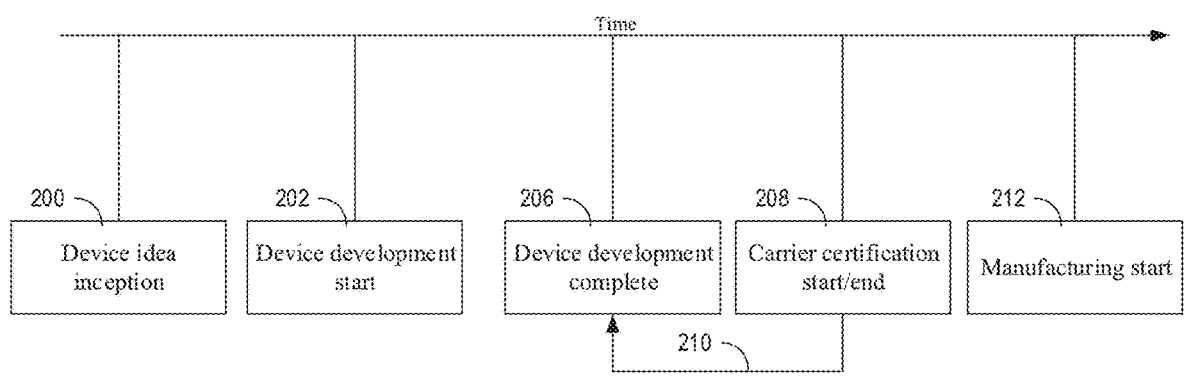
FIG. 2 illustrates an example IoT device manufacturing timeline according to one or more embodiments.

Referring now to FIG. 2, illustrated is an example IoT device manufacturing timeline according to one or more embodiments. At step 200 a device idea can be conceived prior to the beginning of device development at step 202. In traditional processes, after the device development complete step 206, a carrier certification can begin at step 208. However, device manufacturers would like to certify devices with the latest revision of firmware. Consequently, if they are required to go back and input a device ID as represented at step 210, then what they are certifying at step 208 does not actually comprise the final change prior to the device manufacturing beginning at step 212. Thus, to track their revisions properly, they would need to know at step 206 what the device ID is, but the way that devices are on-boarded currently does not allow for that.

Figure 3:
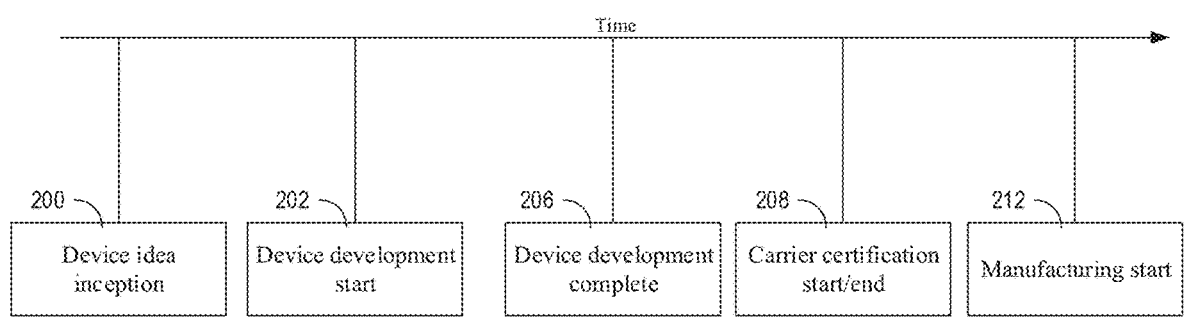
FIG. 3 illustrates an example IoT device manufacturing timeline according to one or more embodiments.

Referring now to FIG. 3, illustrated is an example IoT device manufacturing timeline according to one or more embodiments. As depicted in FIG. 3, at step 200 a device idea can be conceived prior to the beginning of device development at step 202. In traditional processes as referenced in FIG. 2, after the device development complete step 206, a carrier certification can begin at step 208. However, device manufacturers would like to certify devices with the latest revision of firmware. Consequently, if device manufacturers are required to go back and input a device ID as represented at step 210, then what the device manufacturers are certifying at step 208 does not actually comprise the final change prior to the device manufacturing beginning at step 212. Thus, to track the device manufacturers revisions properly, the device manufacturers would need to know at step 206 what the device ID is. However, the way that devices are on-boarded currently does not allow for that. Hashing of identification data (e.g., manufacturer name, software version, hardware version, device name, etc.) after step 206 and comparing to carrier hashing, can facilitate a seamless authentication and/or identification process for IoT devices prior to the certification step 208. Additionally, this can remove and/or mitigate the step 210 from FIG. 3 whereby the system can recursively revisit the device development step 206 to facilitate carrier certification at step 208.

It should also be noted that after a hash is generated, additional data can be added to the hash to modify the hash. For example, if network testing highlights an issue that needs to be corrected, then the software version can be modified to an updated version. Consequently, the hash can be modified based on the updated software version. Thus, the carrier hashing function and comparison to the manufacturer hashing function can facilitate a matching of the hashing functions such that step 210 is unneeded to facilitate the device manufacturing beginning at step 212. It should be noted that although the hashing function can hash data comprising manufacturer name, software version, hardware version, and/or device name, either less hash data or more hash data can be hashed according to carrier and/or the manufacturer conditions.

Figure 4:
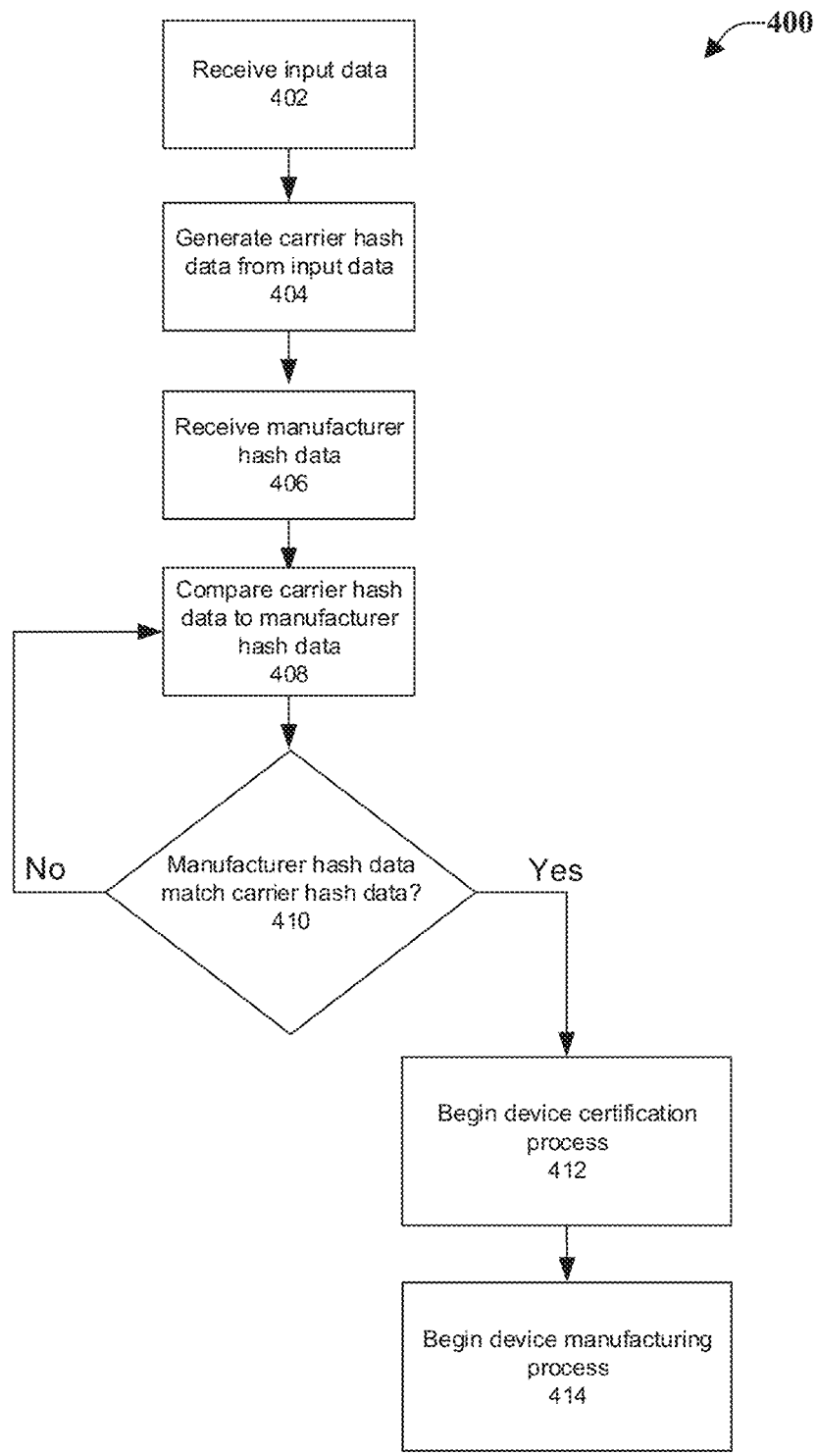
FIG. 4 illustrates an example IoT device authentication diagram according to one or more embodiments.

Referring now to FIG. 4, illustrated is an example IoT device authentication system block diagram 400 according to one or more embodiments. The system block diagram 400 can comprise an initial step of receiving input data at block 402. For example, the input data can comprise manufacturer name data, software version data, hardware version data, and/or device name data. Additionally, the input data can be received from a carrier identity prior to and/or in conjunction with a manufacturer process. At block 404, has data (e.g., a hash value) can be generated by the carrier based on the input data received at block 402. After the hash data is generated at block 404, the system block diagram 400 can receive manufacturer hash data at block 406, and compare the manufacturer hash data to the carrier hash data at block 408.

At block 410, the system block diagram 400 can make a determination based on the comparison of at block 408. For example, if the manufacturer hash data from block 408 matches the carrier hash data from block 404, then the system block diagram 400 can proceed to block 412 where the IoT device can undergo a certification process prior to the IoT device undergoing a manufacturing process at block 414. Otherwise, the system block diagram 400 can proceed back to the block 408 where the carrier hash data can be compared to the manufacturer hash data until a match between the two can justify progress through block 410 to block 412.

Figure 5:
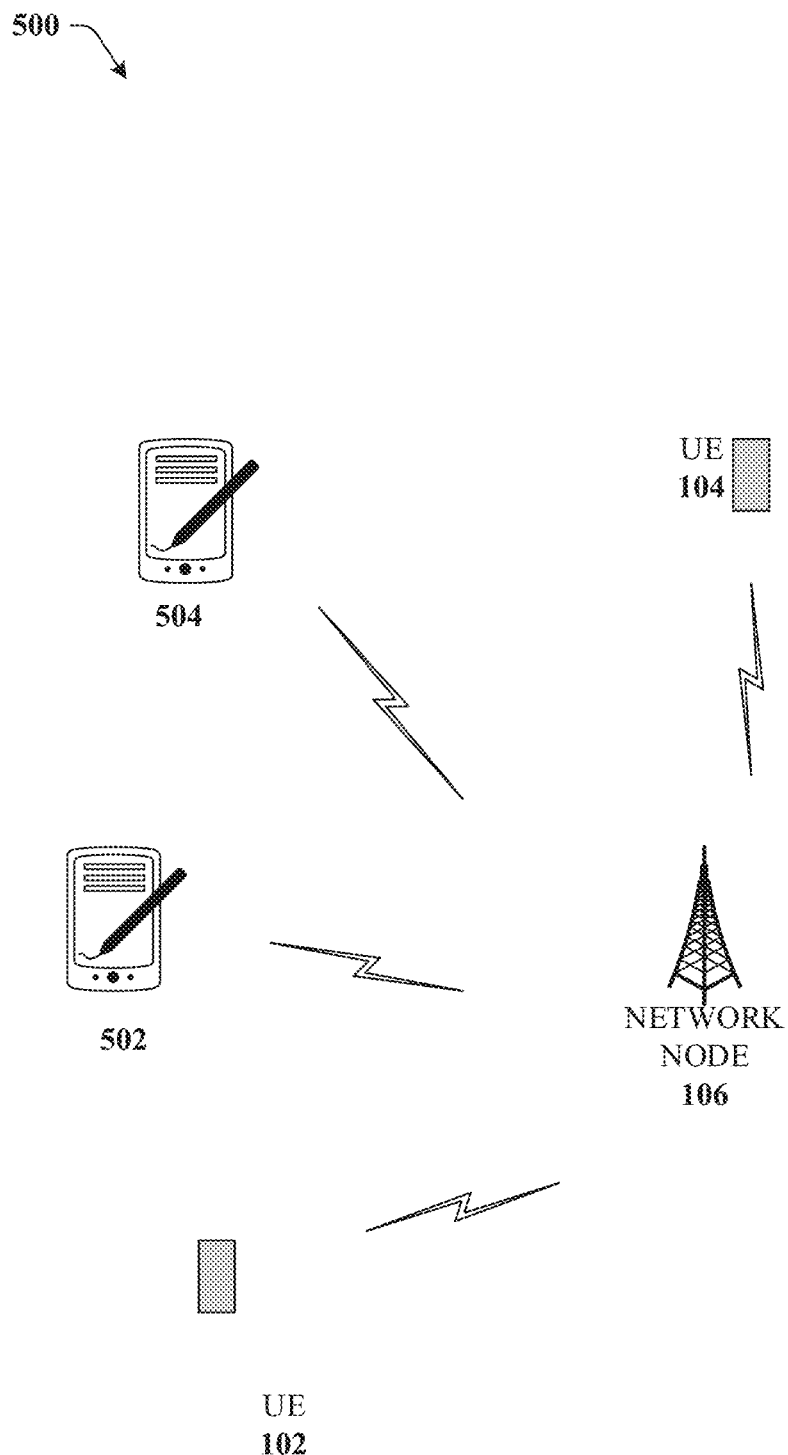
FIG. 5 illustrates an example schematic system block diagram of a wireless network comprising authenticated IoT devices according to one or more embodiments.

Referring now to FIG. 5, illustrated is an example schematic system block diagram of a wireless network comprising authenticated IoT devices according to one or more embodiments. As depicted in FIG. 5, once a device is in the field and communicating over the network (e.g., network node 106), then the IoT devices (e.g., UE 102, 104, IoT 502, 504, etc.) can then send back the hash value, associated with the device, which was collected at the certification start. Because that hash is connected to that particular device that was certified, then the carrier can tell how many of that exact model number (e.g., IoT 502, 504) of the devices are on the network (e.g., network node 106).

Figure 6:
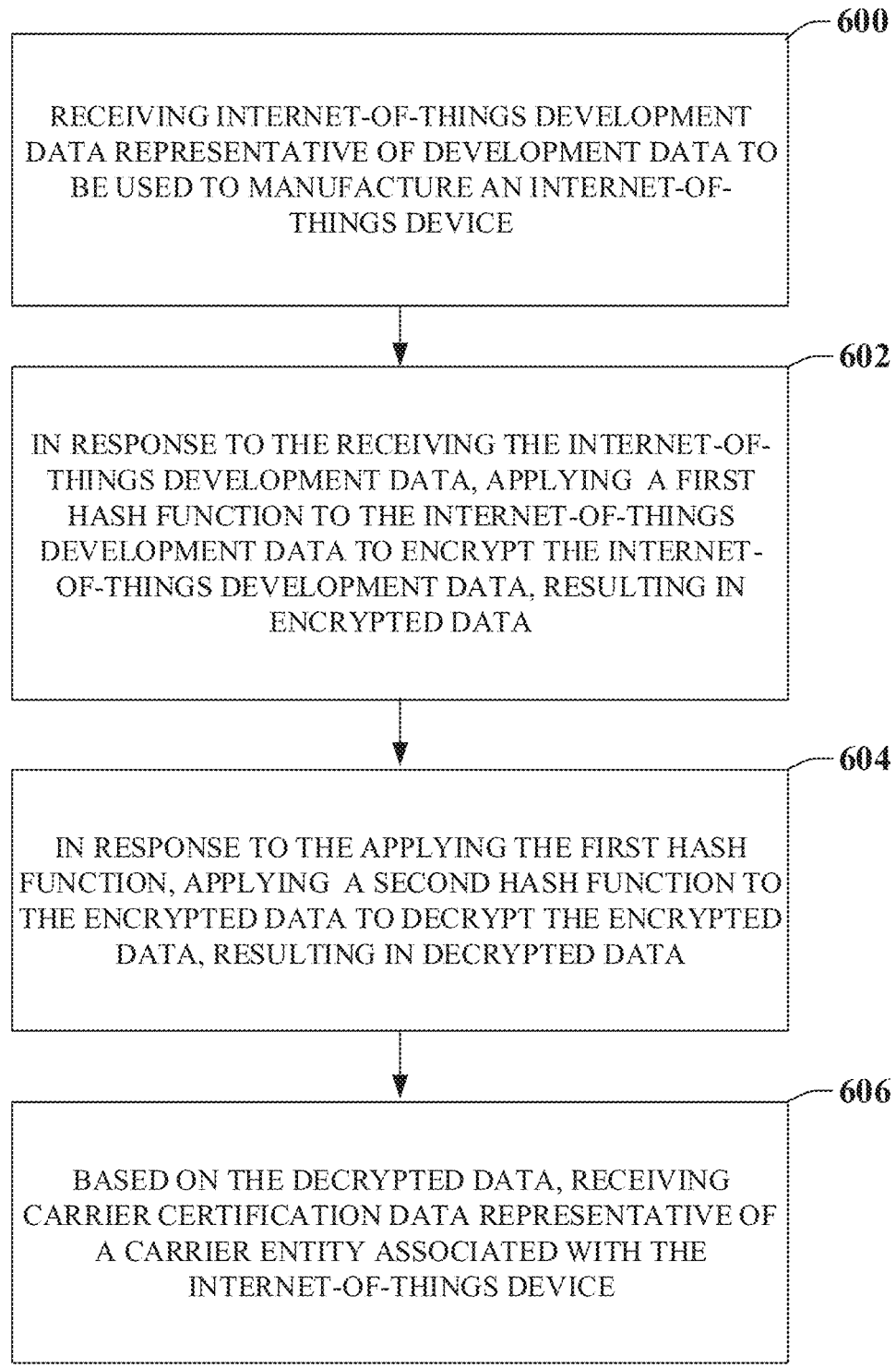
FIG. 6 illustrates an example schematic flow diagram of a method for authenticating IoT devices according to one or more embodiments.

Referring now to FIG. 6, illustrated is an example schematic flow diagram of a method for authenticating IoT devices according to one or more embodiments. At element 600, internet-of-things development data representative of development data to be used to manufacture an internet-of-things device can be received. In response to the receiving the internet-of-things development data at element 600, the method can comprise applying a first hash function to the internet-of-things development data to encrypt the internet-of-things development data, resulting in encrypted data at element 602. Additionally, at element 604, in response to the applying the first hash function, the method can comprise applying a second hash function to the encrypted data to decrypt the encrypted data, resulting in decrypted data. Furthermore, based on the decrypted data, the method can comprise receiving, at element 606, carrier certification data representative of a carrier entity associated with the internet-of-things device.

Figure 7:
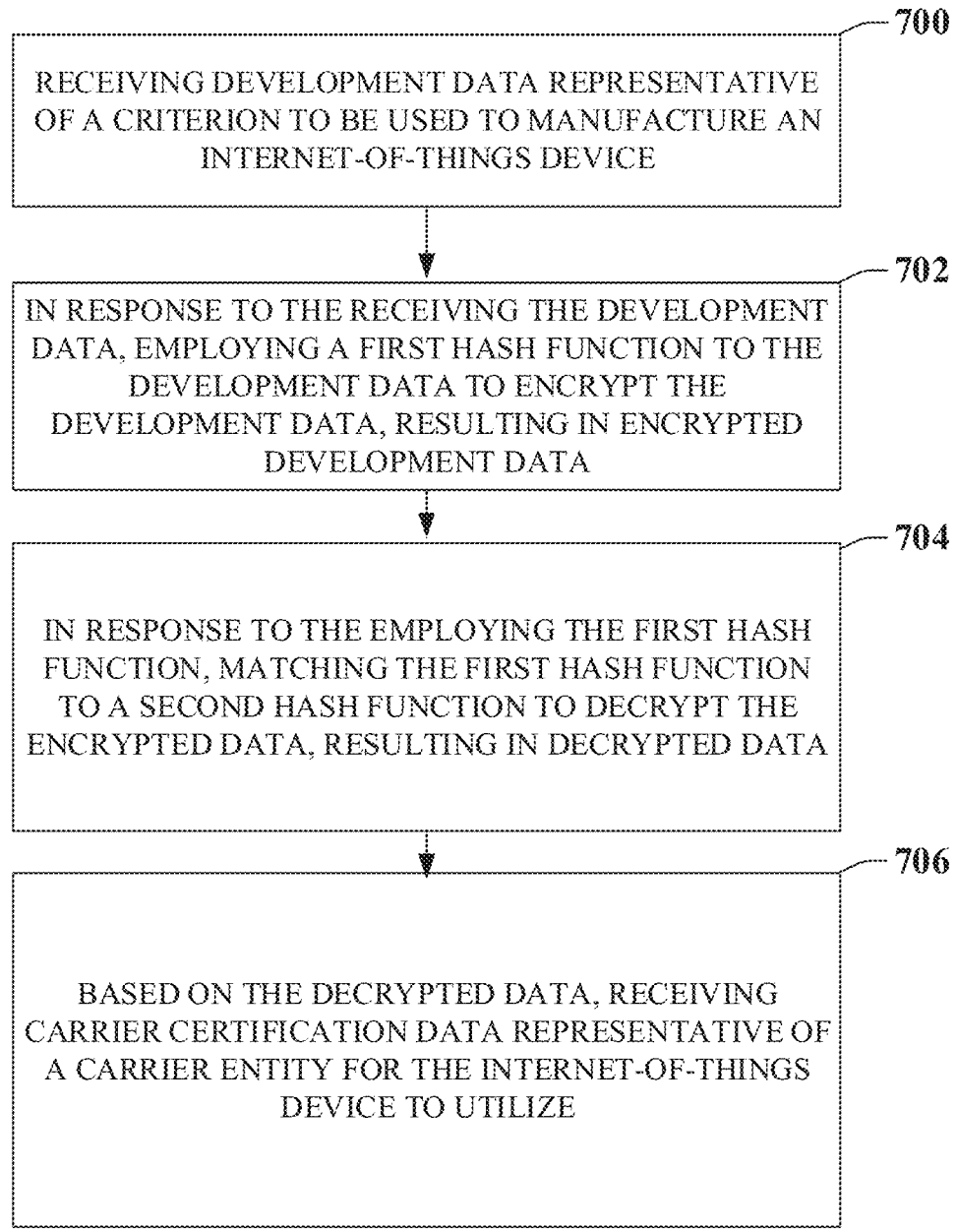
FIG. 7 illustrates an example schematic flow diagram of a system for authenticating IoT devices according to one or more embodiments.

Referring now to FIG. 7, illustrated is an example schematic flow diagram of a system for authenticating IoT devices according to one or more embodiments. At element 700, the system can comprise receiving development data representative of a criterion to be used to manufacture an internet-of-things device. In response to the receiving the development data, the system operations can comprise employing a first hash function to the development data to encrypt the development data, resulting in encrypted development data at element 702. In response to the employing the first hash function, the system operations can comprise matching the first hash function to a second hash function to decrypt the encrypted data, resulting in decrypted data at element 704. Additionally, based on the decrypted data, the system operations can comprise receiving carrier certification data representative of a carrier entity for the internet-of-things device to utilize at element 706.

Figure 8:
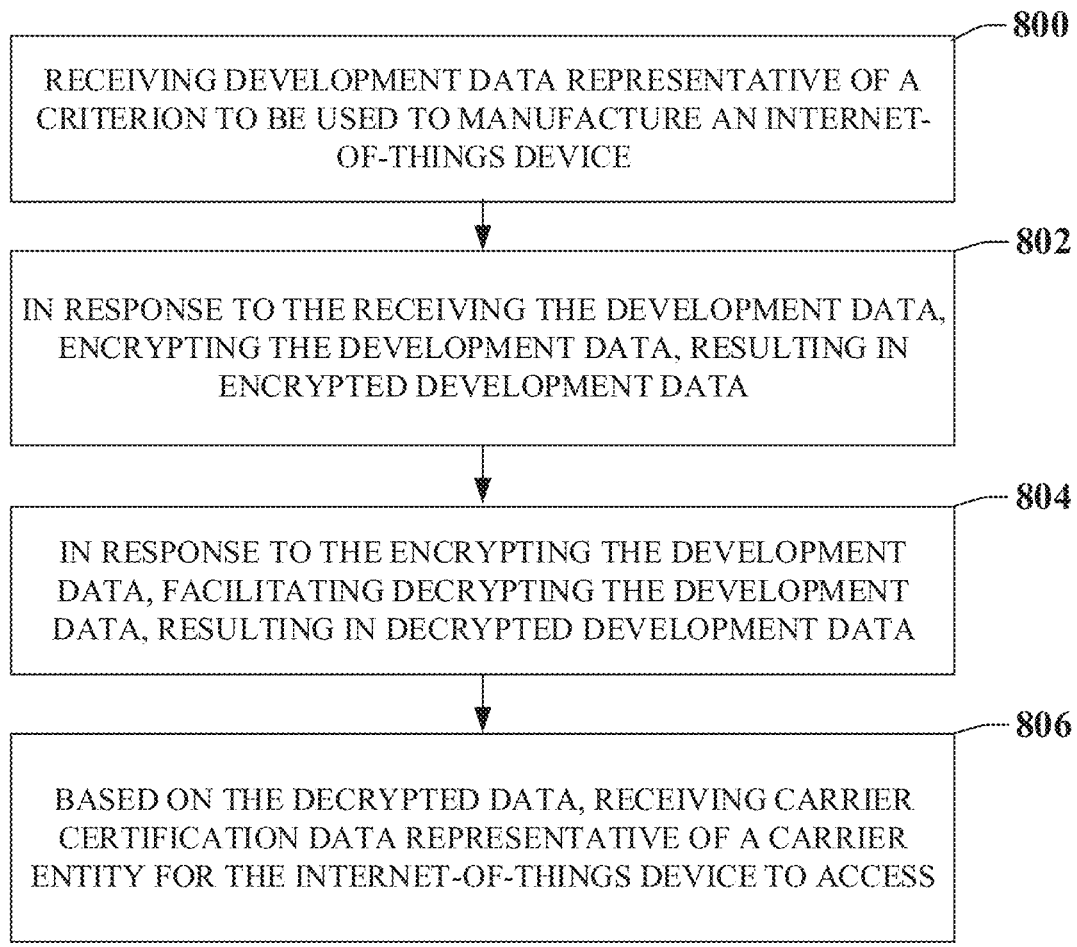
FIG. 8 illustrates an example schematic flow diagram of a machine-readable medium for authenticating IoT devices according to one or more embodiments.

Referring now to FIG. 8, illustrated is an example schematic flow diagram of a machine-readable medium for authenticating IoT devices according to one or more embodiments. According to yet another embodiment, at element 800, a machine-readable storage medium that can perform the operations comprising receiving development data representative of a criterion to be used to manufacture an internet-of-things device. The machine-readable storage medium can perform the operations comprising encrypting the development data at element 802, resulting in encrypted development data in response to the receiving the development data. In response to the encrypting the development data, the machine-readable storage medium can perform the operations comprising facilitating decrypting the development data at element 804, resulting in decrypted development data. Furthermore, at element 806, based on the decrypted data, the machine-readable storage medium can perform the operations comprising receiving carrier certification data representative of a carrier entity for the internet-of-things device to access.

Figure 9:
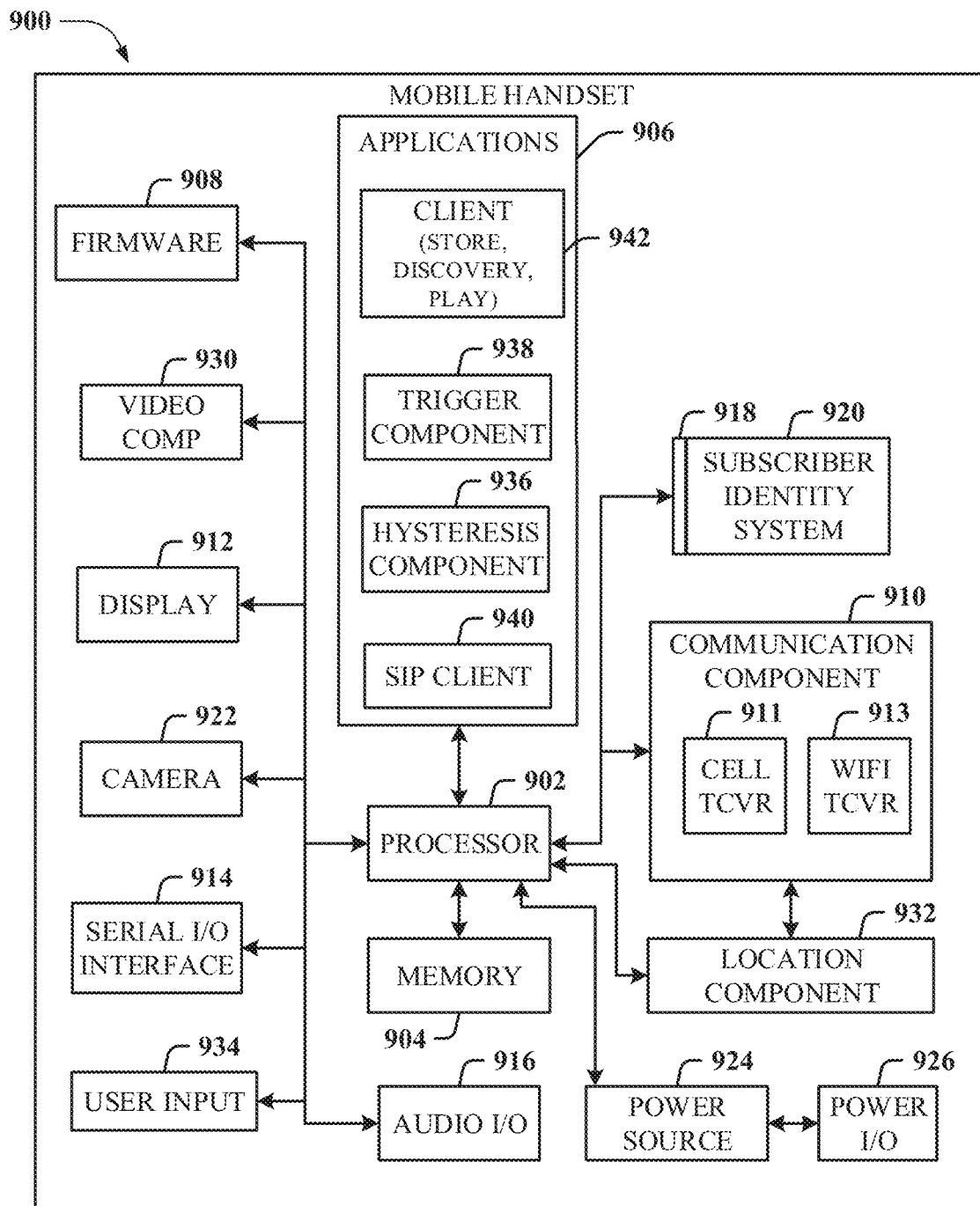
FIG. 9 illustrates an example block diagram of an example mobile handset operable to engage in a system architecture that facilitates secure wireless communication according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
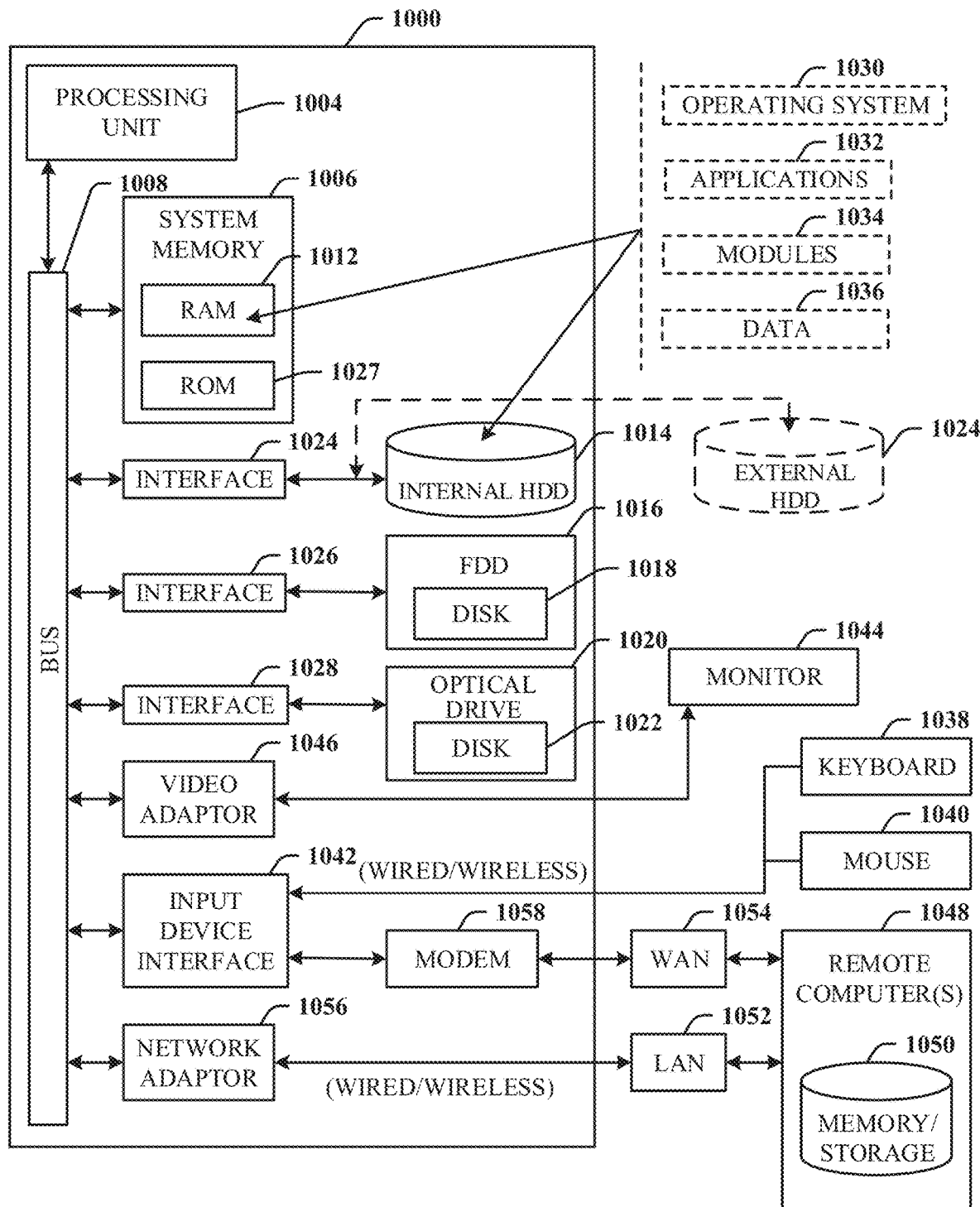
FIG. 10 illustrates an example block diagram of an example computer operable to engage in a system architecture that facilitates secure wireless communication according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 7 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
receiving, by network equipment comprising a processor, internet-of-things development data representative of development data to be used to manufacture an internet-of-things device;
in response to the receiving the internet-of-things development data, applying, by the network equipment, a first hash function to the internet-of-things development data to encrypt the internet-of-things development data, resulting in encrypted data, wherein the first hash function is associated with a manufacturer identity;
in response to the applying the first hash function, applying, by the network equipment, a second hash function to the encrypted data to decrypt the encrypted data, resulting in decrypted data, wherein the second hash function is associated with a carrier identity;
in response to applying the second hash function, matching, by the network equipment, the first hash function to the second hash function, resulting in a hash function match; and
based on the hash function match, receiving, by the network equipment, carrier certification data representative of a carrier certification, from the carrier identity, associated with the internet-of-things device.

2. The method of claim 1, wherein the internet-of-things development data comprises company name data representative of a company that comprises a capability to manufacturing the internet-of-things device.

3. The method of claim 2, wherein the internet-of-things development data comprises device name data representative of an identification of the internet-of-things device.

4. The method of claim 3, wherein the internet-of-things development data comprises software data representative of a software version to be utilized by the internet-of-things device.

5. The method of claim 4, wherein the internet-of-things development data comprises hardware data representative of a hardware version to be utilized by the internet-of-things device.

6. The method of claim 1, wherein the first hash function is a secure hash function.

7. The method of claim 1, further comprising:
increasing, by the network equipment, a length associated with the first hash function to increase a security feature of the first hash function.

8. A system, comprising:
a processor; and
a memory that stores executable instructions that, when executed by the processor, facilitate performance of operations, comprising:
receiving development data representative of a criterion to be used to manufacture an internet-of-things device;
in response to the receiving the development data, employing a first hash function to the development data to encrypt the development data, resulting in encrypted development data, wherein the first hash function is associated with a manufacturer entity;
in response to the employing the first hash function, matching the first hash function to a second hash function to decrypt the encrypted data, resulting in decrypted data wherein the second hash function is associated with a carrier entity; and
based on the decrypted data, receiving carrier certification data representative of a carrier certification, from the carrier entity for the internet-of-things device to utilize.

9. The system of claim 8, wherein the operations further comprise:
receiving, from the internet-of-things device, hash data associated with the first hash function.

10. The system of claim 9, wherein the internet-of-things device is a first internet-of-things device, and wherein the operations further comprise:
in response to the receiving the hash data, determining that a second internet-of-things device is a same type of internet-of-things device as the first internet-of-things device.

11. The system of claim 10, wherein the operations further comprise:
determining a number of internet-of-things devices that are the same type of internet-of-things as the first internet-of-things devices.

12. The system of claim 8, wherein the development data comprises manufacturer name data representative of a manufacturer of the internet-of-things device, software data representative of software to be employed by the internet-of-things device, hardware data representative of hardware to be employed by the internet-of-things device, and name data representative of a identification of the internet-of-things device.

13. The system of claim 8, wherein the operations further comprise:
utilizing a public key to facilitate an encryption of the development data, resulting in the encrypted development data.

14. The system of claim 13, wherein the operations further comprise:
in response to the utilizing the public key to facilitate the encryption of the development data, decrypting the encrypted development data to facilitate a manufacturing process.

15. A non-transitory machine-readable medium, comprising executable instructions that, when executed by a processor, facilitate performance of operations, comprising:
receiving development data representative of a criterion to be used to manufacture an internet-of-things device;
in response to the receiving the development data, encrypting the development data utilizing a first hash function associated with a manufacturing identity, resulting in encrypted development data;
in response to the encrypting the development data, facilitating decrypting the development data, resulting in decrypted development data, wherein decrypting the development data utilizes a second hash function from a carrier identity;

matching the first hash function to the second hash function; and based on matching the first hash function to the second hash function, receiving carrier certification data representative of a carrier certification, from the carrier identity, for the internet-of-things device to access.

16. The non-transitory machine-readable medium of claim 15, wherein the encrypting the development data comprises utilizing asymmetric cryptography.

17. The non-transitory machine-readable medium of claim 15, wherein the development data comprises manufacturer identification data representative of a manufacturer of the internet-of-things device.

18. The non-transitory machine-readable medium of claim 16, wherein the development data comprises software data representative of software to be employed by the internet-of-things device.

19. The non-transitory machine-readable medium of claim 17, wherein the development data comprises hardware data representative of hardware to be employed by the internet-of-things device.

20. The non-transitory machine-readable medium of claim 19, wherein the development data comprises device name data representative of a name of the internet-of-things device.

* * * * *